UNITED STATES PATENT OFFICE.

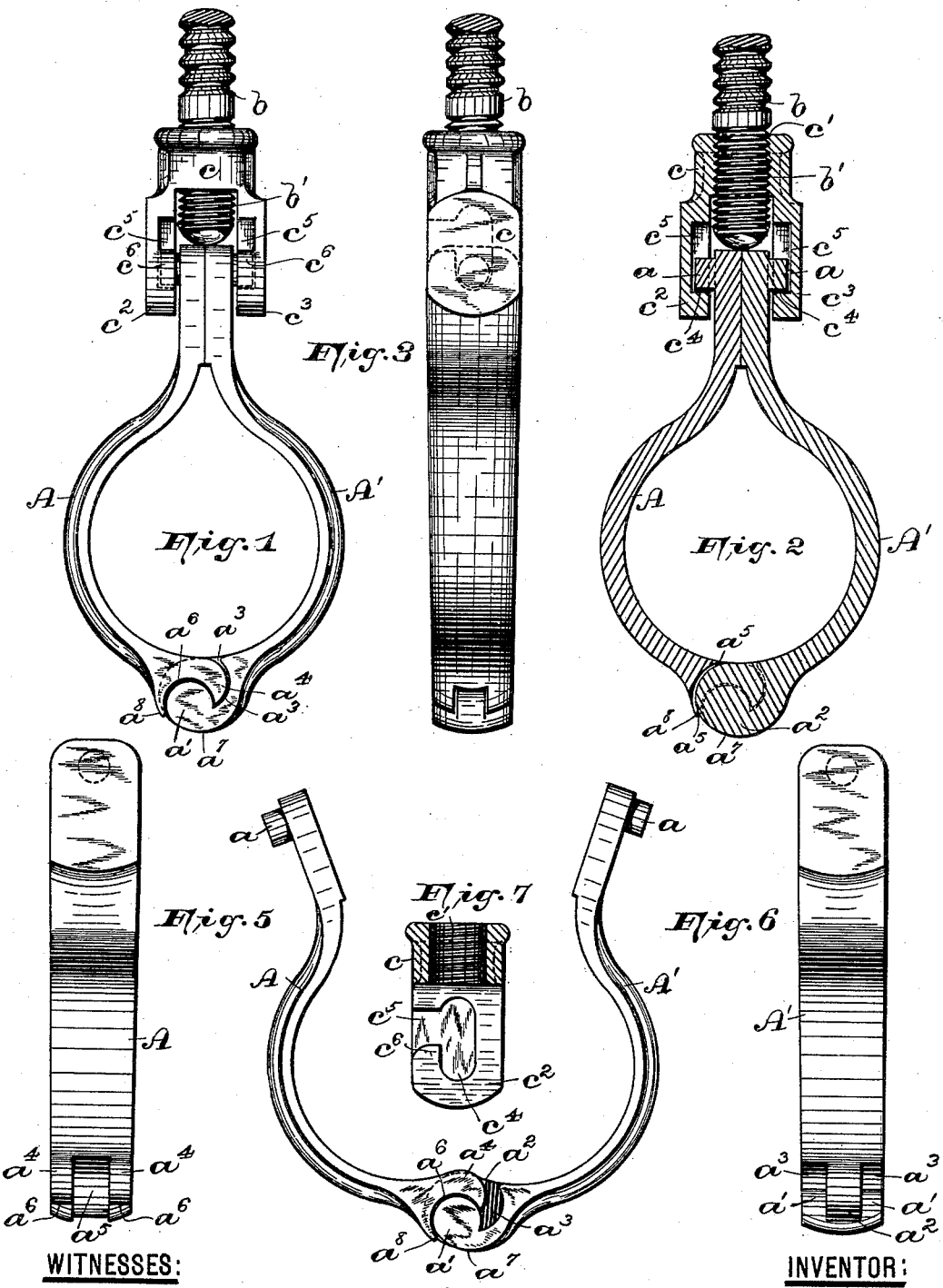

GEORGE W. CLARK, OF NEWARK, NEW JERSEY.

PIPE-HANGER.

SPECIFICATION forming part of Letters Patent No. 430,623, dated June 24, 1890.

Application filed October 22, 1889. Serial No. 327,864. (No model.)

*To all whom it may concern:*

Be it known that I, GEORGE W. CLARK, a citizen of the United States, residing at Newark, in the county of Essex and State of New Jersey, have invented certain new and useful Improvements in Pipe-Hangers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to pipe-hangers, and the purpose of the same is to secure a strong and serviceable hanger adapted to be placed in position around a pipe at any point without necessitating the slipping of the hanger over the end of the pipe, and then sliding it along upon the same into its desired position; and, furthermore, the said invention is designed to provide such a hanger having means arranged on the upper ends of the stirrup-sections for pivotally supporting the same within journal-bearings arranged in a suspension device, whereby the hanger is adapted to readily adjust itself around the pipe when expansion of the latter takes place in the direction of the length of the pipe.

To these ends the invention consists of a vertically-divided stirrup or yoke composed of separable sections provided at their lower ends with dovetailed or interlocking parts adapted to rotate or oscillate about a common center, whereby the separable sections are interlocked or held together, whether the said stirrup-sections are closed around the pipe or open when detached therefrom, and at the same time allowing the complete separation of the parts of the said oscillating joint with little trouble. This construction of. the two stirrup or yoke sections enables them to be connected or disconnected from the pipe without first separating the said sections at their interlocked and oscillating joint at their lower ends.

The invention further consists in providing the separable sections of which the yoke or stirrup is composed with journal-pins adapted to be hung or arranged within a journal-box or similar suspension device, provided with a threaded eye or perforation, through which the holding rod or screw is inserted, from which the yoke or stirrup may be removed without necessitating the removal of the bolt or screw from the ceiling, and by means of which, if desirable, the ends of the bolt or screw may be caused to engage with the upper end of the stirrup, so that when the same is suspended from its journal-box any movement of the sections in a vertical plane will be prevented.

In the accompanying sheet of drawings, in which similar letters of reference indicate corresponding parts in each of the views, Figure 1 is a front elevation of my improved hanger embodying the present invention, illustrating the separable sections of which the stirrup or yoke is composed in their closed positions and locked at their lower ends by means of the oscillating joint. Fig. 2 is a vertical section of the same, and Fig. 3 represents a side elevation of the hanger. In Fig. 4 is illustrated the positions of the separable sections when removed from the journal box or suspension device, which is attached to the screw or bolt in the ceiling above the line of piping, and illustrating the holding relation of the dovetailed or interlocking parts of the oscillating joint when the said sections have been removed from the pipe, or before they are placed in position around the same. Figs. 5 and 6 are elevations of the inner sides of the two separable sections, respectively; and Fig. 7 represents a vertical section of the journal-box or suspension device, showing one of its downwardly-projecting arms provided on its inner side thereof with a bearing-surface, upon which the journal-pins on the sections are placed and rotate.

The separable joint at the ends of the sections comprising the stirrup or yoke is an automatically-acting holding-joint, which, when the stirrup has been removed from its sustaining-rod, prevents the complete separation of said sections until they are separated by a slight force brought to bear upon them by the operator. When in position around the pipe and secured to the bolt or screw, the joint is locked and prevents the possible separation of the parts of the hanger.

In said above-described views is illustrated the construction and arrangement of the several parts of the hanger, which I will now proceed to describe, and which is finally embodied in the clauses of the claim.

The stirrup or yoke, which may be made of any desirable metal, (preferably cast or malleable iron,) consists of two separable portions or sections A A', bent or formed, substantially as illustrated, to conform with the shape of the pipe, said sections being similar in size and shape, except that one of said sections is provided at its lower end with two dovetailed or rounded portions or tongues $a'$ $a'$, having arranged between the said tongues a dividing wall or rib $a^2$, and which tongues and wall form on the opposite sides of the latter the recessed or undercut portions $a^3$ $a^3$, while the other section is provided at its lower end with outwardly-extending dovetailed and hooked portions $a^4$ $a^4$, having a centrally-arranged slot $a^5$ between them, and provided directly beneath said extending portions $a^4$ with the cut-away or recessed portions $a^6$ $a^6$. From Figs. 1, 2, and 4 it will readily be seen that the tongues $a'$ fit into the recessed portions $a^6$, the dovetailed extensions $a^4$ into the undercut portions $a^3$, and the wall or rib $a^2$ into the slot $a^5$ in the respective sections A A', composing the yoke or stirrup.

The construction and arrangement of the dovetailed parts which constitute the oscillating joint at the lower part of the stirrup will best be understood from Figs. 2 and 4, and it will be readily seen that the ends of the two sections can easily be forced into one another, and thus form the oscillating joint, which allows the dovetailed tongues to rotate in their corresponding recessed or undercut portions, and vice versa. Owing to the eccentricity of the lower side $a^7$ of the section A', the other section A is caused to turn on its joint the proper distance, said side $a^7$ acting as a stop to the further movement of the end $a^8$ on said section A, and thereby causing the hooked portions $a$ and the rounded portions $a'$ to bind tightly together, and thereby holding the two sections apart, as is clearly shown in Fig. 4, with the several parts of the hinge in holding engagement, and without any danger of the two sections becoming completely separated and one of them falling to the floor during the handling of the same before placing them around the pipe. The upper ends of the sections A A' are provided with the journal pins or arms $a$ $a$.

From Figs. 1, 2, and 3 it will be observed that the screw or bolt $b$ is threaded, as at $b'$, and has attached thereto a suspension device $c$, provided with the threaded eye $c'$, which receives the end $b'$ of the sustaining rod or bolt $b$. As will be seen from Figs. 1, 2, and 7, the suspension device $c$ has arranged thereon two downwardly-extending sides or arms $c^2$ $c^3$, which are cut away on their inner sides to form the journal-bearings $c^4$ for the arms or journal-pins $a$ on the sections of the stirrup. When said sections A and A' have been jointed or secured together, as in Fig. 4, and they have been arranged around the pipe and closed upon each other, their upper ends, provided with the journal arms or pins $a$, are passed between the downwardly-projecting arms $c^2$ and $c^3$, and the journal-pins $a$ passed through recessed portions $c^5$ in each of said arms and slipped behind an upwardly-projecting lug or post $c^6$ and dropped into their bearings $c^4$ in the journal-box or suspension device $c$, as shown in Figs. 1 and 2.

As is more clearly shown in Fig. 7, the lower side of the bearing $c^4$, upon which the journal-pin $a$ rests, is semicircular, thus allowing the rotating or swinging movement of the stirrup, which thereby adjusts itself to any unevenness in the surface of the pipe, and also adjusts itself by means of this swinging motion to the lateral expansion of the pipe. This is of great advantage, as it is well known that when the pipe becomes heated the greatest expansion takes place in the direction of the length of the pipe, and, as is well known, pipe-hangers which are rigidly secured to their suspension-screws are thus very often caused to break. In the present construction of pivoting the sections A A' within the journal-box or suspension device $c$ this cannot happen, as the stirrup or yoke of the hanger moves with the pipe in the direction of its length, and thereby adjusts itself to the most desirable position. When the stirrup has been attached to said suspension device $c$, the end $b'$ of the bolt or screw $b$ may be caused to engage with the upper ends of the sections of the yoke or stirrup by means of a turn or two of said screw or bolt, and hence it will be seen that any vertical movement of the two stirrup-sections which may be caused by the "jumping" of the pipe is prevented, thereby being securely held in place, and they can only become disengaged from the journal-box or suspension device $c$ when the bolt or lag-screw has been screwed up sufficiently to allow the removal of the journal-pins $a$ from their bearings and their passage through the recessed portions $c^5$.

From the present construction it is evident that my improved hanger can be applied in any desirable position in a line of piping, which is already up, and can be screwed up so that the inner side of the stirrup or yoke fully engages with the bottom of the pipe, and thereby sustains the line of piping in position.

One of the most essential features of the present construction is the arrangement of the dovetailed parts at the lower ends of the stirrup-sections, which parts are thereby easily forced into each other and form a joint with an oscillating motion, and by means of which said sections may be held far enough apart to allow the placing in position of the stirrup around the pipe or the removal of the same from the pipe without completely separating the said sections at their lower ends or necessitating the separate handling of each section by the operator when in the act of securing or removing the same from the line of piping. When the said sections have been attached to each other, they can be carelessly handled without the danger of separating them from each other, being held in that relative position to one another, as is illustrated in Fig. 4.

Another great advantage obtained is that the parts are hinged or jointed and adapted to rotate upon each other without the use of a pin or bolt and nut, and they can be put together or separated without sliding one upon the other in the direction of the transverse length of the stirrup or yoke around the pipe, and parallel with the said line of piping which the stirrup is to support.

Having thus described my invention, what I claim is—

1. In a pipe-hanger, the combination, with a sustaining-rod or its equivalent, of a stirrup or yoke consisting of separable sections provided at their upper ends with means for securing the same to said sustaining-rod, and provided at their lower and opposite ends with interlocking portions which form a joint having an oscillating motion, one of said sections having on its under side an eccentrically-shaped or enlarged surface, whereby the free end of the other section is caused to bind against said eccentric surface on the first section when the joint has been opened, and thereby hold the said sections in an open position, substantially as and for the purposes set forth.

2. In a pipe-hanger, the combination of a stirrup or yoke consisting of separable sections provided at their upper ends with means for attaching the same to a suspension device, and provided at their lower ends with a separable joint, provided with hooked and rounded portions, which embrace and oscillate within each other, and one of said sections being eccentrically shaped on its under side, with which the free and under end of the opposite section engages when the joint is opened, and causing said hooked portions to bind tightly around the rounded portions, and hold said joint in an open position without causing the entire separation of the said sections when the stirrup is removed from the line of pipe, and means engaging with the suspension device for supporting the stirrup, as and for the purposes set forth.

3. In a pipe-hanger, the combination of two sections, one of which is provided with an eccentric or enlarged surface on its under side, said sections being connected by a separable oscillating joint, one portion of which consists of dovetailed extensions and recesses having a wall or rib therebetween, and the other portion of the said joint provided with correspondingly dovetailed extensions and recesses having a slot therebetween, said extensions being hook shape and surrounding the rounded extensions in the other section, said parts fitting into each other, as set forth, rotating or oscillating upon each other, and causing said hooked extensions to tightly bind against the eccentric surface and the rounded extensions or portions on the other section, and holding said sections in an open position when separate from the line of pipe, and a suspension device secured to the top of said sections when in position around the pipe, and a sustaining-rod or its equivalent for supporting said suspension device and the stirrup, substantially as and for the purposes set forth.

4. In a pipe-hanger, the combination of two sections connected by a separable oscillating joint consisting of dovetailed portions fitting into each other, one of said sections being eccentrically shaped on its lower side, as set forth, and the other section being provided with hook-shaped extensions, which hook around the rounded extensions in the other section, and which are adapted to engage with said eccentrically-formed portion on the under side of the opposite section, and thereby cause said hooked portions or extensions to bind tightly against the rounded portions and eccentric surface or portion on the other section, and thereby holding said sections in an open position when separate from the line of pipe, journal-pins or arms on the upper ends of said sections, and a suspension device provided with a threaded eye for the reception of a sustaining rod or screw, and having arms thereon with bearings into which said journal-pins on the separable sections extend and rotate, for the purposes set forth.

5. In a pipe-hanger, the combination, with a sustaining bolt or screw, of a pipe yoke or stirrup composed of two vertically-divided separable sections, one of said sections being provided at its lower end with rounded portions or extensions $a'$ and recesses $a^3$, and a rib or wall $a^2$, and the other of said sections having correspondingly-arranged hooked portions or extensions $a^4$, forming recesses $a^6$, and a slot $a^5$, said parts thereby being adapted to interlock and form a hinge, the hooked portion on the one section oscillating about said rounded extensions $a'$ on the other section as a center, substantially as and for the purposes set forth.

6. In a pipe-hanger, the combination, with a sustaining rod or screw, of a pipe yoke or stirrup composed of vertically-divided and separable sections, one of said sections being provided at its lower end with rounded portions or extensions and recesses, and an enlarged or eccentrically formed portion on its under side beneath said rounded portions, while the other of said sections is provided at its lower end with correspondingly-arranged rounded portions or extensions, and recesses adapted to engage with the rounded portions and recesses in the other section, and the free and lower ends of said hooked portions acting as a stop on one section, adapted to engage with said eccentrically-formed portion on the other section, and thereby causing the hooked portions on one section to bind tightly against the rounded portions on the other section, and thereby limiting the movement of the hinge formed by said hooked and rounded portions, and holding said sections in an open position, as and for the purposes set forth.

7. In a pipe-hanger, the combination of two sections connected at their lower ends by an oscillating joint consisting of rounded portions or extensions $a'$ and recesses $a^3$, and a rib or wall $a^2$ in one of said sections, and the other of said sections having correspondingly-arranged hooked portions or extensions $a^4$ and recesses $a^6$, and a slot $a^5$, said parts interlocking, and the hooked portions in one section rotating upon the rounded portions in the other section, as set forth, journal-pins arranged on the upper ends of said sections, and a suspension device having a threaded eye in its top for the reception of a sustaining rod or screw, and said suspension device having downwardly-projecting arms thereon, provided with recessed portions $c^5$, and posts or lugs $c^6$, and bearings $c^4$, in which said journal-pins are adapted to be held and rotate for supporting said stirrup-sections around the line of pipe, as and for the purposes set forth.

8. In a pipe-hanger, the combination, with a suspension device adapted to be secured to a screw or its equivalent and provided with downwardly-projecting arms thereon having recessed portions $c^5$ and posts or lugs $c^6$, and journal-bearings $c^4$, of a stirrup or yoke consisting of separable sections provided with journal-pins formed on said sections, whereby they are pivotally and removably arranged in said bearings in the suspension device, said stirrup or yoke thereby being caused to move or swing in the direction of the greatest expansion of the pipe, and means at the lower ends of said sections for detachably connecting said sections, as and for the purposes set forth.

9. In a pipe-hanger, the combination, with a suspension device having a threaded eye for securing the same to a screw or its equivalent and provided with downwardly-projecting arms thereon, provided with recessed portions $c^5$ and posts or lugs $c^6$, and journal-bearings $c^4$, of a stirrup or yoke consisting of separable sections provided with journal-pins formed on the upper ends of said sections, whereby they are pivotally and removably arranged in said bearings in the said suspension device, said stirrup or yoke thereby being caused to move or swing in the direction of the greatest expansion of the pipe, and the lower ends of said sections being provided with correspondingly-arranged dovetailed extensions and recesses, and a rib or wall in one section and a correspondingly-arranged slot in the other section, said parts being arranged to form a separable hinge-joint, for the purposes set forth.

10. A pipe-hanger consisting of two sections connected by a separable hinge-joint, one of said sections being provided on its under side with an eccentric surface, said joint comprising therein hooked or rounded portions, said hooked portions being provided with a semicircular recess corresponding to the shape of the rounded portions and adapted to rotate thereon, whereby the free ends of said recessed or hooked portions are caused to engage with said eccentric surface and cause the parts of the hinge to bind tightly together and hold the sections in an open position when removed from the line of pipe, for the purposes set forth.

In testimony that I claim the invention set forth above I have hereunto set my hand this 18th day of October, 1889.

GEORGE W. CLARK.

Witnesses:
 FREDK. C. FRAENTZEL,
 WM. H. CAMFIELD.